US011334900B1

(12) United States Patent
Tushinskiy (10) Patent No.: US 11,334,900 B1
(45) Date of Patent: *May 17, 2022

(54) VOICE-BASED COLLECTION OF STATISTICAL DATA

(71) Applicant: INSTREAMATIC, INC., Palo Alto, CA (US)

(72) Inventor: Stanislav Tushinskiy, Mountain View, CA (US)

(73) Assignee: INSTREAMATIC, INC., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/522,944

(22) Filed: Nov. 10, 2021

Related U.S. Application Data

(63) Continuation-in-part of application No. 17/467,487, filed on Sep. 7, 2021.

(51) Int. Cl.
| G06Q 30/02 | (2012.01) |
| G06F 16/23 | (2019.01) |
| G10L 25/84 | (2013.01) |
| G10L 15/26 | (2006.01) |

(52) U.S. Cl.
CPC ......... *G06Q 30/0203* (2013.01); *G06F 16/23* (2019.01); *G06Q 30/0204* (2013.01); *G10L 15/26* (2013.01); *G10L 25/84* (2013.01)

(58) Field of Classification Search
CPC . G06Q 30/0203; G06Q 30/0204; G10L 25/84
See application file for complete search history.

(56) References Cited

U.S. PATENT DOCUMENTS

| 9,123,254 | B2* | 9/2015 | Chivukula | ............... G09B 7/00 |
| 10,271,093 | B1* | 4/2019 | Jobanputra | ......... G06F 16/3329 |
| 11,250,857 | B1* | 2/2022 | Kim | ........................ G10L 15/26 |
| 2001/0047292 | A1* | 11/2001 | Montoya | ................ G06Q 30/02 |
| | | | | 705/14.44 |

(Continued)

OTHER PUBLICATIONS

Privacy Implications of Voice and Speech Analysis—Privacy and Identity Management. Data for Better Living: AI and Privacy. Privacy and Identity 2019. IFIP Advances in Information and Communication Technology, vol. 576. (Year: 2019).*

(Continued)

*Primary Examiner* — James M Detweiler
(74) *Attorney, Agent, or Firm* — Georgiy L. Khayet (57) ABSTRACT

Systems and methods for voice-based collection of statistical data are provided. An example method includes sensing, by an acoustic sensor, an ambient acoustic signal; determining, by one or more processors communicatively coupled to a user device and the acoustic sensor, that the user device has played a question prompting a user to answer the question; analyzing, by the one or more processors, the ambient acoustic signal to determine that the user has uttered an answer; converting, by the one or more processors, the ambient acoustic signal including the uttered answer into audio data; sending, via the user device, the audio data to a remote computing system; converting the audio data into text and at least one feature associated with the user; generating a record including the text and the at least one feature; and adding, by the remote computing system, the record to the statistical data.

19 Claims, 6 Drawing Sheets

(56) References Cited

U.S. PATENT DOCUMENTS

| | | | | |
|---|---|---|---|---|
| 2008/0240379 A1* | 10/2008 | Maislos | ............... | H04L 65/1083 379/88.13 |
| 2012/0264446 A1* | 10/2012 | Xie | ........................ | G01C 22/00 455/456.1 |
| 2013/0226578 A1* | 8/2013 | Bolton | ................. | H04N 21/262 704/235 |
| 2018/0232752 A1* | 8/2018 | BaderEddin | ............ | G10L 13/08 |
| 2020/0227038 A1* | 7/2020 | Bender | ............... | G10L 15/1815 |

OTHER PUBLICATIONS

Privacy Implications of Voice and Speech Analysis—Information Disclosure by Inference (Privacy and Identity 2019. IFIP Advances in Information and Communication Technology, vol. 576. Springer, Cham. https://doi.org/10.1007/978-3-030-42504-3_16-0) (Year: 2019).*

* cited by examiner

Convert, by the remote computing system, the audio data into text of the answer and at least one feature associated with the user
505

Generate, by the remote computing system, a record including the text and the at least one feature
510

Add, by the remote computing system, the record to statistical data
515

VOICE-BASED COLLECTION OF STATISTICAL DATA

CROSS REFERENCE TO RELATED APPLICATIONS

This application is a Continuation-in-Part of, and claims the priority benefit of, U.S. patent application Ser. No. 17/467,487, filed on Sep. 7, 2021, and entitled "Voice Survey Collection and Analysis." The subject matter of the aforementioned application is incorporated herein by reference in its entirety.

TECHNICAL FIELD

This disclosure generally relates to the field of collecting statistics. More particularly, this disclosure relates to systems and methods for voice-based collection of statistical data.

BACKGROUND

Collecting statistical data concerning preferences of customers is widely used for many applications, such as advertisements, estimating quality of services and products, business development, and others. One of the important features in collecting the statistical data is determining relationships between preferences of a customer and a group to which the customer belongs. Typically, the customer is being asked to provide their personal data, such as age and gender, either by explicitly typing the personal data information into a questionnaire or authorizing a user device to provide the personal data to an application running on the user device. Another drawback of current methods for collecting statistical data is that the customer is required to type in or select an answer in the survey using the user device or a remote control to a media device. Both these shortcomings may prevent many of the customers from participating in surveys. Therefore, there is a need for a convenient and non-intrusive way to collect statistical data from customers.

SUMMARY

This section introduces a selection of concepts in a simplified form that are further described in the Detailed Description section, below. This summary does not identify key or essential features of the claimed subject matter and is not intended to be an aid in determining the scope of the claimed subject matter.

The present disclosure is directed to systems and methods for voice-based collection of statistical data. Some embodiments of the present disclosure may facilitate collecting answers from users while the users are watching a video or listening to an audio on a user device.

According to an example embodiment, a system for voice-based collection of statistical data is provided. The system may include a user device, an acoustic sensor configured to sense an ambient acoustic signal, and one or more processors communicatively coupled to the user device and the acoustic sensor. The one or more processors may be configured to determine that the user device has played a question prompting a user to answer the question. In an example embodiment, the question may include a prompt for the user to express an opinion concerning a product or a service associated with a provider. The question may further include a prompt for the user to characterize a feature of an item the user possesses. The item may include one of the following: a piece of furniture, a piece of appliances, a vehicle, and so forth. The feature of the item may include an age or any other characteristics of the item.

The one or more processors may be further configured to analyze, in response to the determination that the user device has played the question, the ambient acoustic signal to determine that the user has uttered an answer. The one or more processors may be configured to convert the ambient acoustic signal that includes the uttered answer into audio data. The one or more processors may be further configured to send, via the user device, the audio data to a remote computing system. The remote computing system may be configured to convert the audio data to text and at least one feature associated with the user. The remote computing system may be further configured to generate a record including the text and the at least one feature. The remote computing system may be configured to add the record to the statistical data.

In an example embodiment, the at least one feature associated with the user may be determined based on a background noise in the audio data. In a further example embodiment, the at least one feature may be determined based on a collection of background noise in the audio data received from the user device at different times. The at least one feature may include one of the following: a location of the user, a musical background, a presence of children, a presence of a pet, and so forth. In a further example embodiment, the at least one feature associated with the user may include one or more of the following: a gender of the user, an age of the user, an emotional state of the user, a medical condition of the user, a voice fingerprint of the user, and so forth. In some embodiments, the at least one feature may include a level of activity of the user, a type of activity the user performed, a level of mobility of the user, and the like.

According to another embodiment, a method for voice-based collection of statistical data is disclosed. The method may include sensing, by an acoustic sensor, an ambient acoustic signal. The method may further include determining, by one or more processors communicatively coupled to a user device and the acoustic sensor, that the user device has played a question prompting a user to answer the question. The method may continue with analyzing, by the one or more processors and in response to the determination that the user device has played the question, the ambient acoustic signal to determine that the user has uttered an answer. The method may further include converting, by the one or more processors, the ambient acoustic signal that includes the uttered answer into audio data. The method may proceed with sending, by the one or more processors and via the user device, the audio data to a remote computing system. The method may further include converting, by the remote computing system, the audio data to text and at least one feature associated with the user. The method may continue with generating, by the remote computing system, a record that includes the text and the at least one feature. The method may further include adding, by the remote computing system, the record to the statistical data.

According to yet another aspect of the disclosure, a non-transitory processor-readable medium, which stores processor-readable instructions, is provided. When the processor-readable instructions are executed by a processor, they cause the processor to implement the above-mentioned method for voice-based collection of statistical data.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

DETAILED DESCRIPTION

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

The technology described herein relates to systems and methods for voice-based collection of statistical data. Some embodiments of the present disclosure may facilitate collecting voice answers from users while the users are watching a video or listening to an audio on user devices. The answers can be collected in a form of audio data. The audio data can be analyzed to determine both the text of the answers and at least one characteristics of the users, such as age and gender. The text and the characteristics collected from multiple users can be added as records into statistical data. The statistical data can be stored and analyzed in remote computing systems.

The systems and methods for voiced-based collection of statistical data of the present disclosure may be used for conducting voice surveys, collecting opinions, attitude, and/or intents of multiple users with regard to products, services, people, events, subjects, and the like, collecting statistical data, and other purposes for which surveys may be needed.

According to an example embodiment of the present disclosure, a system for voice-based collection of statistical data is disclosed. The system may include a user device, an acoustic sensor configured to sense an ambient acoustic signal, and one or more processors communicatively coupled to the user device and the acoustic sensor. The one or more processors may be configured to determine that the user device has played a question prompting a user to answer the question. The one or more processors may be further configured to analyze, in response to the determination, the ambient acoustic signal to determine that the user has uttered an answer. The one or more processors may be configured to convert the ambient acoustic signal including the uttered answer into audio data. The one or more processors may be further configured to send, via the user device, the audio data to a remote computing system. The remote computing system may be configured to convert the audio data into text and at least one feature associated with the user. The remote computing system may be further configured to generate a record including the text and the at least one feature. The remote computing system may be configured to add the record to the statistical data.

Figure 1:
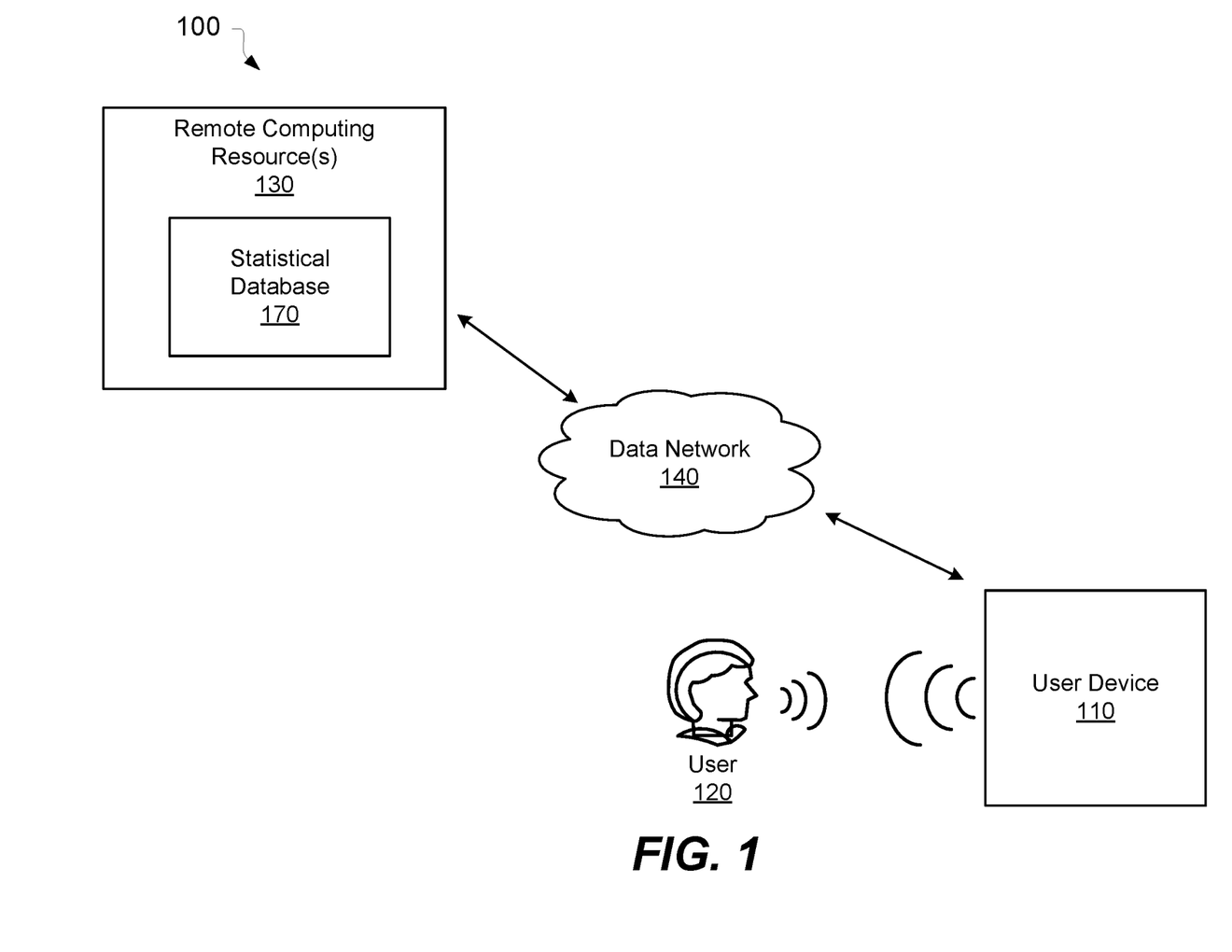
FIG. 1 is a block diagram showing an example environment, in which a system and a method for voice-based collection of statistical data can be implemented.

Referring now to the drawings, FIG. 1 shows an example environment 100, in which a system and a method for voice-based collection of statistical data can be implemented. The environment 100 may include a user device 110, a user 120, a remote computing resource(s) 130, a statistical database 170, and a data network 140.

The user device 110 can include any combination of radio frequency receivers, transmitters, and transceivers, wired and/or wireless telecommunications and/or networking devices, amplifiers, audio and/or video players, encoders, decoders, speakers, inputs, outputs, storage devices, and user input devices. The user device 110 can be configured to receive a media stream and play the media stream to the user 120 using an output device (for example, speakers or earphones). The user device 110 can be configured to sense ambient acoustic sound using an acoustic sensor, for example, one or more microphones. The user device 110 can be configured to detect the voice of the user 120 in the ambient acoustic sound. The user device 110 may include, but is not limited to, a laptop, a desktop computer, a tablet computer, a phablet, a personal digital assistant, a media player, a mobile telephone, a smart television set, in-vehicle infotainment, a smart home device, a car with a voice assistant system, a personal computing device including a voice assistant system, a smartphone, and the like. In general, the user device 110 may include any device having a voice assistant system. An example user device 110 is described in detail in FIG. 2.

In some embodiments, the user device 110 may include a communication unit to receive media streams via one or more media stream players. In certain embodiments, the media stream can be delivered using the data network 140. The data network 140 can refer to any wired, wireless, or optical networks including, for example, the Internet, intranet, local area network (LAN), Personal Area Network, Wide Area Network (WAN), Virtual Private Network, cellular phone networks (e.g., a Global System for Mobile (GSM) communications network, a packet switching communications network, a circuit switching communications network), Bluetooth™ radio, an Ethernet network, an IEEE 802.11-based radio frequency network, a Frame Relay network, an Internet Protocol (IP) communications network, or any other data communication network utilizing physical layers, link layer capability, or network layers to carry data packets, or any combinations of the above-listed data networks. In some embodiments, the data network 140 includes a corporate network, a data center network, a service provider network, a mobile operator network, or any combinations thereof.

In some embodiments, the remote computing resource(s) 130 (also referred to herein as a remote computing system) may be implemented as a server(s) or a cloud-based computing resource(s) shared by multiple users. The remote computing resource(s) 130 can include hardware and software available at a remote location and accessible over the data network 140. The remote computing resource(s) 130 can be dynamically re-allocated based on demand. The cloud-based computing resource(s) may include one or more server farms/clusters including a collection of computer servers that can be co-located with network switches and/or routers.

The remote computing resource(s) 130 may include the statistical database 170. The user device 110 may be configured to track verbal communications of the user 120 by sensing or recording an ambient acoustic signal and determine that the user 120 has uttered an answer in response to a question played by the user device 110. In some example embodiments, the question may include a prompt for the user 110 to express an opinion concerning a product or a service associated with a provider. In some embodiments, the provider can include any entity, third party, or remote computing resource(s) associated with various commercial and non-commercial organizations.

The use device may convert the ambient acoustic signal that includes the uttered answer into audio data and provide the ambient acoustic signal in form of the audio data to the remote computing resource(s) 130. The remote computing resource(s) 130 may convert the audio data received from the user device 110 into text and at least one feature associated with the user 120. Based on the text and the at least one feature, the remote computing resource(s) 130 may generate a record and store the record as statistical data into the statistical database 170.

In some example embodiments, the user device 110 can determine, via acoustic sensors of the user device 110, a reaction of the user to the question. For example, that the user device 110 can determine that the user 120 has rejected the question by replaying "Not interested." The user device 110 may provide information concerning the reaction of the user 120 to the statistical database 170.

In an example embodiment, the user 120 may listen to an audio or watch a video using the user device 110. The user device 110 may recognize (e.g., based on the metadata in the audio or video stream or by using an acoustic sensor associated with the user device 110) that a question is being asked while the user is listing to the audio or watching the video. For example, the audio or video played to the user 120 may be interrupted and the question may be asked. The question may prompt the user 120 to express the opinion of the user 120 regarding a particular subject or particular product. The user device 110 may recognize (by using an acoustic sensor associated with the user device 110) that the user 110 has uttered the answer and record the user voice. More specifically, upon determining that the question is being asked, the user device 110 may trigger recording (e.g., using a microphone of the user device 110) of the ambient acoustic signal. The user device 110 may analyze the ambient acoustic signal to determine, based on predetermined criteria, that the ambient acoustic signal includes the user voice. Upon determining that the ambient acoustic signal includes the user voice, the user device 110 may send the user voice recorded in the ambient acoustic signal to a remote computing system. The remote computing system may analyze the ambient acoustic signal and convert the ambient acoustic signal into text (that includes information determined based on the user voice) and features determined based on the analysis of the user voice or the background noise in the ambient acoustic signal. The features determined based on the analysis of the user voice may include an age, a gender, an emotional state and other characteristics related to the user. The features determined based on the analysis of the background noise may include a location (a street, a home, a car) of the user, a presence of a family member (e.g., if the voice of a child is identified in the background noise), a presence of a pet (e.g., a barking dog sound or other animal sounds can be identified in the background noise), and so forth. The remote computing system may analyze the text to determine the opinion of the user 120 regarding the particular subject or particular product.

Based on analysis of the audio data, the remote computing system may generate a record that includes the text and the features and add the record to a statistics database. Upon providing questions to and receiving answers from multiple users, the remote computing system may generate multiple records and store the multiple records to the statistics database. Based on the records, the remote computing system may generate a structured report with regard to the opinion of multiple users regarding the particular subject or particular product. The structured report may be provided to any relevant party, such as a provider of the particular product, a party that requested to conduct a survey regarding the particular subject or particular product, or any other entity or person.

Figure 2:
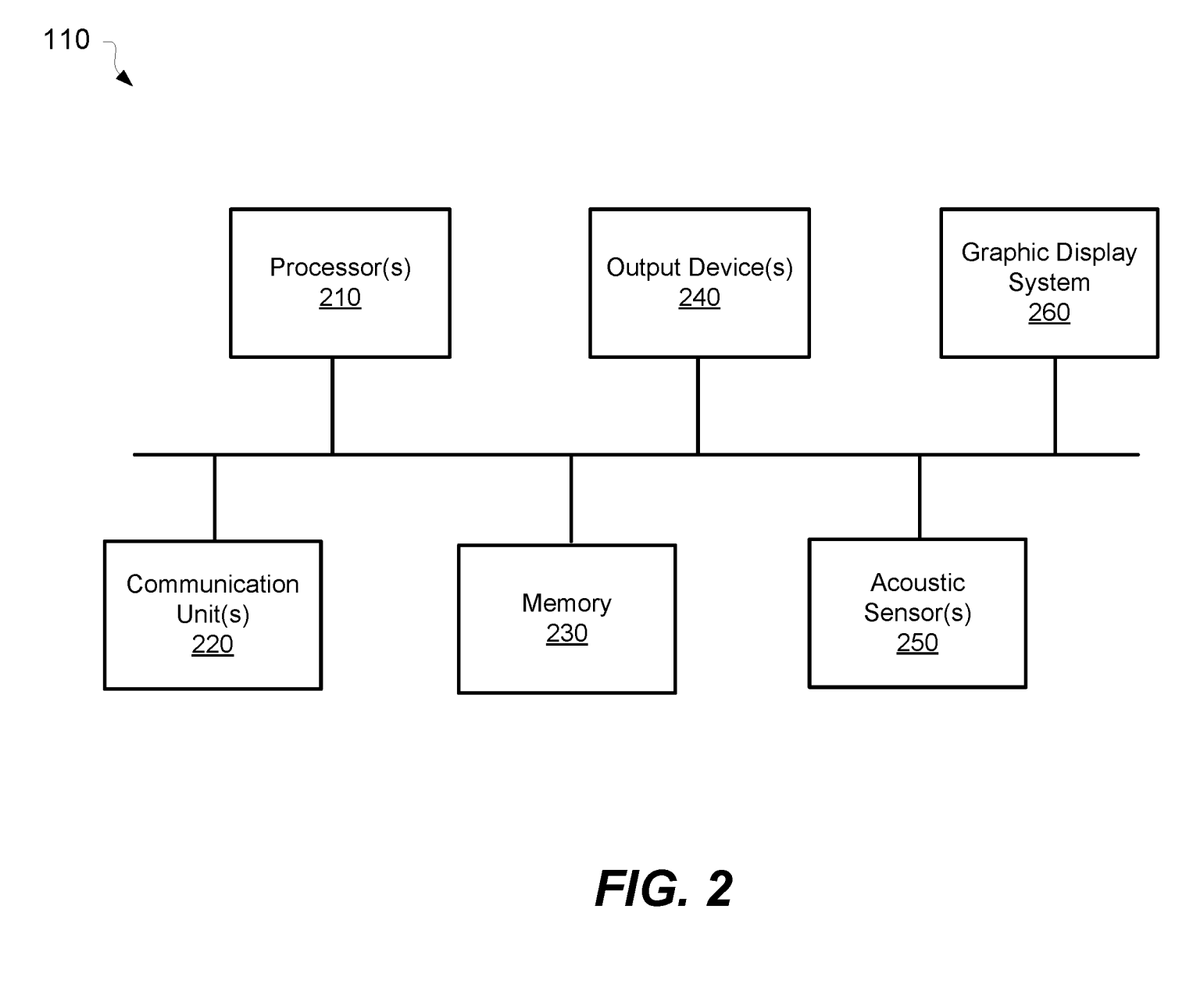
FIG. 2 is a block diagram showing a user device suitable for implementing a method for voice-based collection of statistical data, according to an example embodiment.

FIG. 2 is a block diagram showing a user device 110 suitable for implementing a method for voice-based collection of statistical data, according to an example embodiment. FIG. 2 provides details of the user device 110 of FIG. 1. In the illustrated embodiment, the user device 110 includes one or more processor(s) 210, one or more communication unit(s) 220, a memory 230, one or more output device(s) 240, one or more acoustic sensor(s) 250, and a graphic display system 260. In other embodiments, the user device 110 includes additional or other components necessary for operations of the user device 110. Similarly, in certain embodiments, the user device 110 includes fewer components that perform functions similar or equivalent to those depicted in FIG. 2.

In various embodiments, the processor(s) 210 may include hardware and/or software, which can be operable to execute instructions stored in the memory 230. The processor(s) 210 may include general purpose processors, video processors, audio processing systems, and so forth. The processor(s) 210 may perform floating point operations, complex operations, and other operations, including performing speech recognition based on ambient acoustic signals captured by the acoustic sensor(s) 250 to detect verbal communication between a user and a voice assistant system of the user device 110 and analyzing the verbal communication to detect keywords associated with verbal communication of the user. The keywords said by the user may be used to determine presence, in the verbal communication, of an answer of the user to the question played by the user device. In an example embodiment, the answer may include an opinion of the user concerning a product or a service associated with a provider.

In various embodiments, the communication unit(s) 220 can be configured to communicate with a network such as the Internet, a WAN, a LAN, a cellular network, and so forth, to receive audio and/or video data of media streams. The received audio and/or video data may be then forwarded to the processor(s) 210 and the output device(s) 240.

The acoustic sensor(s) 250 can include one or more microphones. The processor(s) 210 can be configured to receive acoustic signals from an acoustic source, for example, the user of the user device 110, via the acoustic sensor(s) 250 and process the acoustic signals to determine presence of keywords and/or commands in a voice of the user. The acoustic sensor(s) 250 can be spaced a distance apart to allow the processor(s) 210 to perform a noise and/or echo reduction in received acoustic signals. In various embodiments, the processor(s) 210 can be configured to process the acoustic signal to determine a background noise. The processor(s) 210 can use the background noise to determine a location of the user (e.g., a street, a car, a home, a subway, and the like), a musical background, a presence of children, a presence of a pet, and other features associated with the user.

In some embodiments, the output device(s) 240 may include any device configured to provide an audio output to a listener (for example, the user of the user device 110). The output device(s) 240 may include one or more speaker(s), an earpiece of a headset, or a handset. The output device(s) 240 may be configured to play a question prompting the user to answer the question.

In various embodiments, the graphic display system 260 can be configured to provide a graphic user interface. In some embodiments, a touch screen associated with the graphic display system 260 can be utilized to receive an input from the user. The graphic display system 260 may be configured to display a video content of the media stream.

Figure 3:
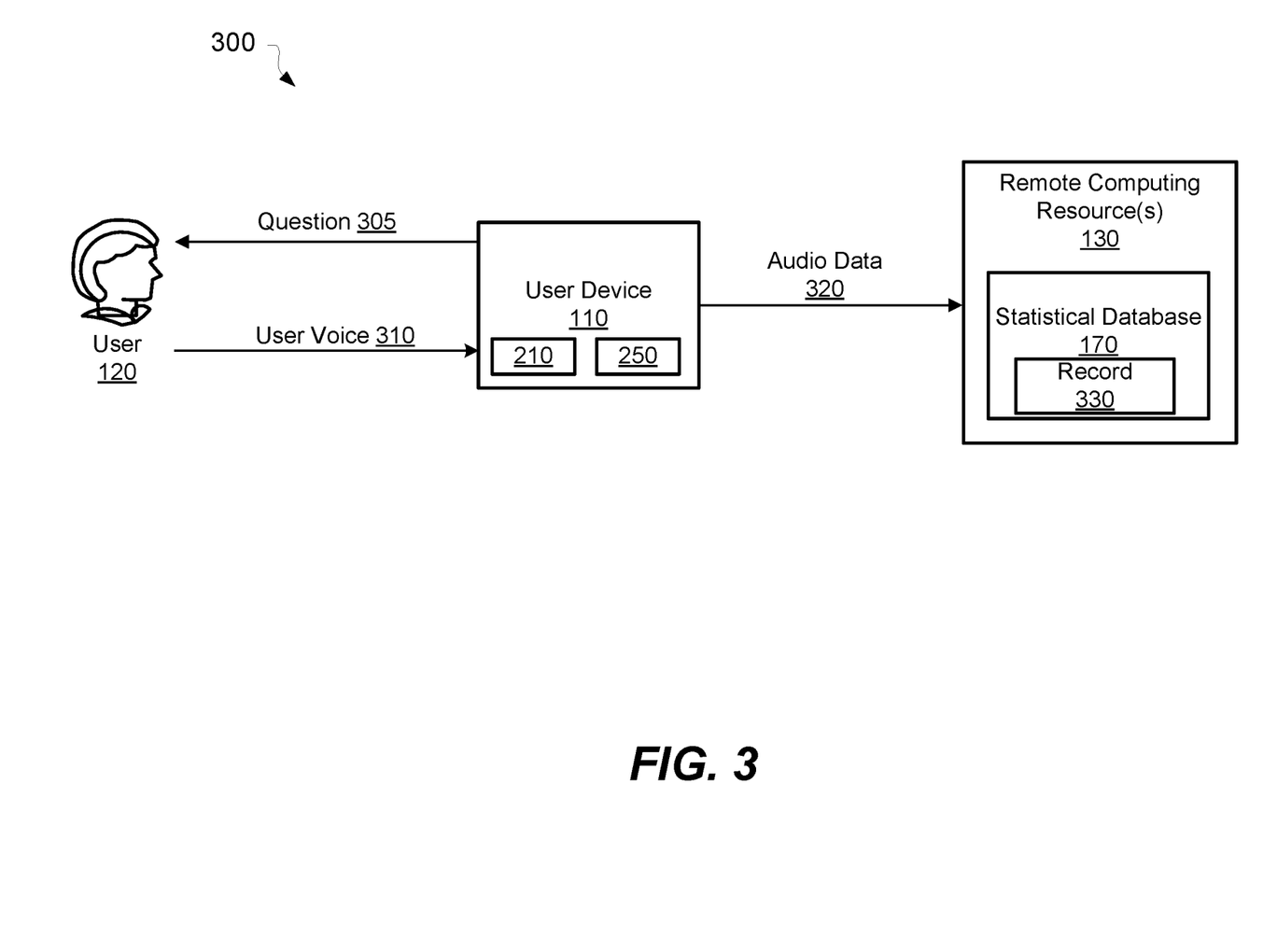
FIG. 3 is a block diagram illustrating a system for voice-based collection of statistical data, according to an example embodiment.

FIG. 3 is a block diagram illustrating a system 300 for voice-based collection of statistical data, according to an example embodiment. The system 300 may include a user device 110, an acoustic sensor 250 configured to sense an ambient acoustic signal, and one or more processors 210 communicatively coupled to the user device 110 and the acoustic sensor 250. The system 300 may be in communication with a remote computing system shown as a remote computing resource(s) 130. The remote computing resource(s) 130 may have a statistical database 170. In an example embodiment, the system 300 and the remote computing resource(s) 130 may be associated with an application (e.g., a voice assistant system) running on the user device 110.

In an example embodiment, a media stream may be provided to the user device 110. The media stream can be a live broadcast or a pre-recorded media stream (podcast). For example, the user 120 may listen to an audio or watch a video on the user device 110. A question 305 can be played within the media stream. The user device 110 may recognize that a question 305 is being asked. For example, the question 305 can be received as a metadata in the media stream and the user device 110 may recognize the metadata of the question 305 in the media stream. The question 305 may include a prompt for the user 120 to express an opinion concerning a product or a service associated with a provider. In other embodiments, the question 305 may include a prompt for the user 120 to characterize a feature of an item the user 120 possesses. In a further example embodiment, the question 305 may include a prompt for the user 120 to provide an intent of the user 120 with respect to a product or a service, e.g., a question whether the user plans to buy the product or the service. In some embodiments, the question 305 may include one or more questions of a sociological survey. The sociological survey may be prepared and provided by the provider of products or services, a sociological institution, or any other entity or person.

More specifically, the one or more processors 210 of the user device 110 may be configured to determine that the user device 110 has played the question 305 prompting the user 120 of the user device 110 to answer the question. In response to the determination that the user device 110 has played the question 305, the one or more processors 210 may analyze the ambient acoustic signal to detect a user voice 310. Based on the detection of the user voice 310 in the ambient acoustic signal, the one or more processors 210 may determine that the user 120 has uttered an answer to the question 305. Based on the determination that the user 120 has uttered the answer, the one or more processors 210 may convert the ambient acoustic signal including the uttered answer into audio data 320 and send, via the user device 110, a message including the audio data 320 to the remote computing resource(s) 130.

The remote computing resource(s) 130 may be configured to receive the message with the audio data 320 from the one or more processors 210 of the user device 110. The remote computing resource(s) 130 may convert the audio data into text and at least one feature associated with the user. The remote computing resource(s) 130 may generate a record 330 that includes the text and the at least one feature and add the record 330 to the statistical data in the statistical database 170

In further example embodiments, the remote computing resource(s) 130 may also analyze the user voice 310 to determine the context provided by the user 120 in the user voice 310. For example, if the question 305 played to the user 120 is "Do you prefer product X, product Y, or product Z?," the user 120 may answer "The first one" instead of directly saying "Product X." The remote computing resource(s) 130 may analyze the context related to the answer "The first one" and determine that the answer relates to "Product X."

The remote computing resource(s) 130 may provide questions to multiple users and collect text and features determined based on answers provided by the multiple users. The collected text and features can be added as records into statistical data in statistical database 170. The statistical data can be stored and analyzed in the remote computing resource(s) 130. In a further example embodiment, the remote computing resource(s) 130 may provide the statistical data to a party that requested to provide a survey and provided the questions to the remote computing resource(s) 130. The party may include a provider of products or services, a sociological institution, and so forth.

In an example embodiment, the analysis performed by the remote computing resource(s) 130 may include profiling of the user based on the analysis of the audio data. The profiling may include determining the features related to the user (such as age, gender, family members, location) based on the user voice and a background noise and attributing, based on the features, the user to one or more of predetermined profiles, such as "men," "women," "30+ years old," "40+ years old," "city X," "has a pet" and the like. The answers provided by the user and determined based on the analysis of the text recognized from the audio data may be grouped based on the profiles. For example, the question may be "Which brand of a car do you prefer?" The analysis may include determining that the largest number of answers received from users attributed to "40+ years old" profile includes "Ford®" and "BMW®," while the answers received from users attributed to "30+ years old" profile are "Mazda®" and "Jeep®."

Similarly, the question may be "Do you like Ford® cars?" The analysis of answers given by the users may show that users attributed to "men" and "50+ years old" profiles rather like Ford® cars, while users attributed to "women" and "20+ years old" do not like Ford® cars.

In an example embodiment, the remote computing resource(s) 130 may use the analyzed collected data for advertisement targeting. For example, an advertisement to be played to the user may be selected based on a brand preferred by a certain group of users (i.e., users having the same profile) to which the user is attributed.

In some example embodiments, if the remote computing resource(s) 130 is unable to determine the text uttered by the user 120 and/or the feature associated with the user 120 in the audio data 320, the remote computing resource(s) 130 may send one or more clarifying questions (not shown) to the user device 110 to prompt the user 120 to clarify the answer of the user 120 to the question 305.

In an example embodiment, the question 305 may sound as follows: "Hey, how old is your car?" The user 120 may provide the following answer "Three years." In some embodiments, a confirmation message may be sent and played by the user device 110. The confirmation message may be, for example, "Thank you!" or "Your answer is received, thank you." The confirmation message can be received as a metadata in the media stream and the user device may recognize the metadata of the confirmation message in the media stream. The remote computing resource(s) 130 can store the answer of the user 120 to the statistical data. The remote computing resource(s) 130 may analyze the audio data of the answer and determine the features associated with the user 120, such as an age, a gender, and so forth. Specifically, the analysis may include, for example, determining characteristics of the user voice 310, such as a tone of the user voice 310, a volume of the user voice 310, a speed of the user voice 310, and so forth. The remote computing resource(s) 130 may match the determined characteristics of the user voice 310 with voice characteristics predetermined for a gender, an age, and so forth. The predetermined voice characteristics may be stored in a database associated with the remote computing resource(s) 130. Based on the match, the remote computing resource(s) 130 may determine the features associated with the user 120, such as age, gender, and so forth. The features associated with the user 120 may be stored to the statistical database 170 and used in the statistical analysis of answers received from multiple users.

In an example embodiment, the one or more processors 210 of the user device 110 may be configured to send data concerning a geographical location of the user device 110 to the remote computing resource(s) 130. For example, the user device 110 may provide parameters related to the user device 110 such as Global Positioning System (GPS) data of the user device 110, to the remote computing resource(s) 130. The geographical location of the user device 110 may be stored to the statistical database 170 and used in the statistical analysis of answers received from multiple users. For example, the analysis may show that users associated with a first location mostly own cars having the age of under three years, while users associated with a second location mostly have ten year old cars.

The same provider may have different questions for users located in different locations. For example, a product provider can provide questions related to one product for users located in one city and provide different questions related to other products for users located in another city. The provider may provide the questions to the remote computing resource(s) 130 for further delivery to the users and analysis of answers.

In some embodiments, the ambient acoustic signal may be analyzed to identify the voice of the user 120 and a background noise of the ambient acoustic signal. Based on the analysis of the voice and the background noise, parameters associated with the user 120, the user device 110, and the user location or other parameters may be determined. For example, an emotion, an age, and a gender of the user 120 may be determined based on the voice of the user 120 and a location of the user 120 may be determined based on type of noise and a level of noise in the background (home, office, street, subway, or cafe). Furthermore, the background noise may be analyzed for the presence of family members, children, or pets. Moreover, the user voice and the background noise may be analyzed, based on predetermined criteria, to determine a medical condition of the user or a probability that the user suffers from some disease.

The features determined based on the ambient acoustic signal and/or parameters of the user device 110 may be stored to the statistical database and used in further analysis. Furthermore, the user device 100 can track activity as characteristics of the user 120, estimate whether the user 120 is working in the office or at home, estimate whether the user 120 is currently travelling, determine the job of the user 120, and so forth. The user device 110 may provide these features to the remote computing resource(s) 130. The remote computing resource(s) 130 can add these features into records and use in further analysis of the collected data.

Figure 4:
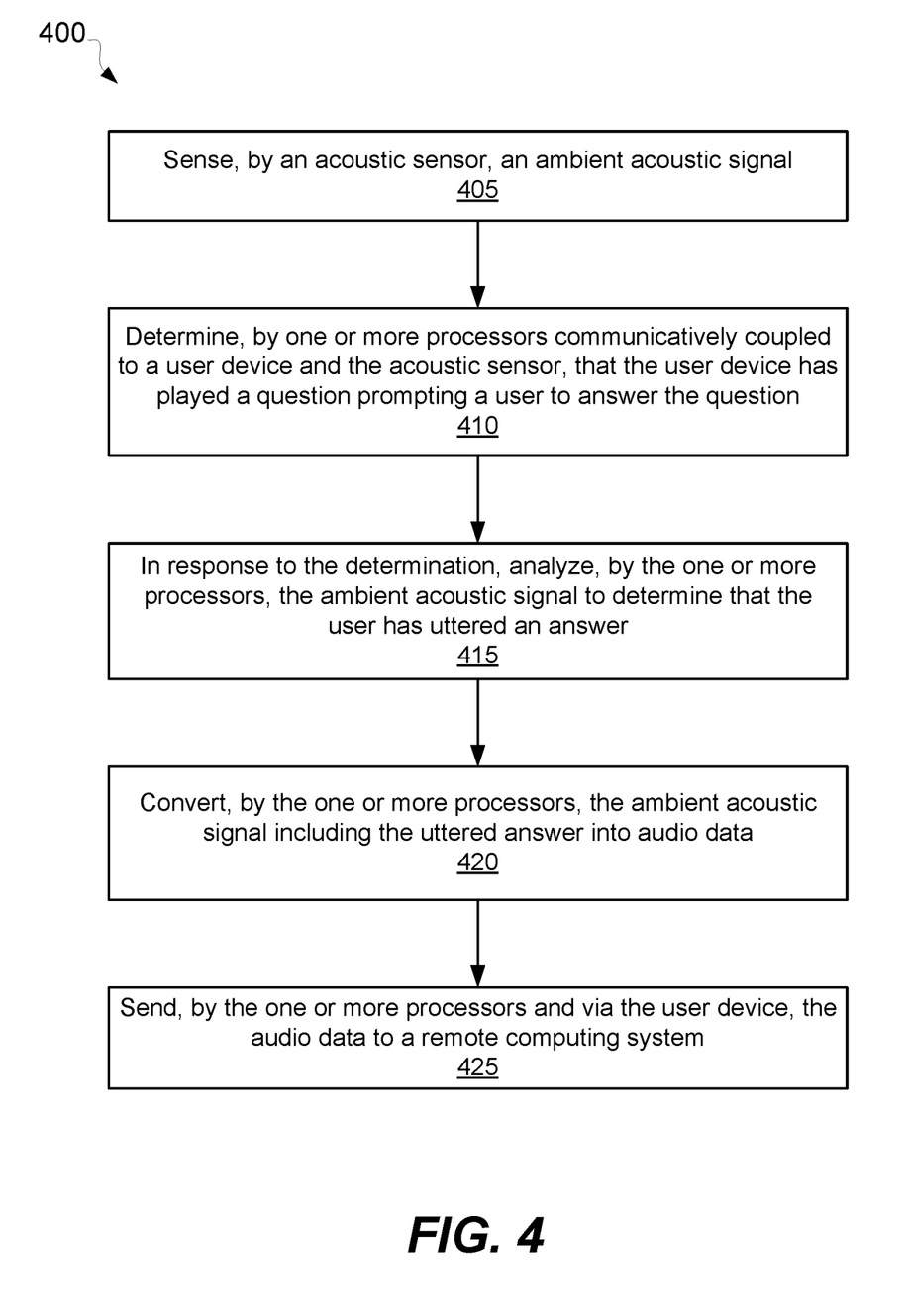
FIGS. 4 and 5 are flow charts showing a method for voice-based collection of statistical data, according to an example embodiment.

FIG. 4 is a flow chart showing a method 400 for voice-based collection of statistical data, according to an example embodiment. The method 400 can be implemented by using the system 300 shown in FIG. 3. For example, the method 400 can be implemented as instructions stored in a memory of a user device which, when being executed by the processors of the user device, may cause the user device to perform the operations of the method 400. In some embodiments, the operations of method 400 may be combined, performed in parallel, or performed in a different order. The method 400 may also include additional or fewer operations than those illustrated.

The method 400 may commence in block 405 with sensing, by an acoustic sensor, an ambient acoustic signal. The method 400 may further include determining, by one or more processors communicatively coupled to a user device and the acoustic sensor, that the user device has played a question prompting a user to answer the question, as shown in block 410. The question may include a prompt for the user to express an opinion concerning a product or a service associated with a provider. The question may further include a prompt for the user to characterize a feature of an item the user possesses. The item may include one of the following: a piece of furniture, a piece of appliances, a vehicle, and so forth. The feature of the item may include, for example, an age of the item.

The method 400 may continue in block 415 with analyzing, by the one or more processors and in response to the determination, the ambient acoustic signal to determine that the user has uttered an answer. The method 400 may further include converting, by the one or more processors, the ambient acoustic signal that includes the uttered answer into audio data, as shown in block 420. The method 400 may proceed with sending, by the one or more processors and via the user device, the audio data to a remote computing system in block 425.

Figure 5:
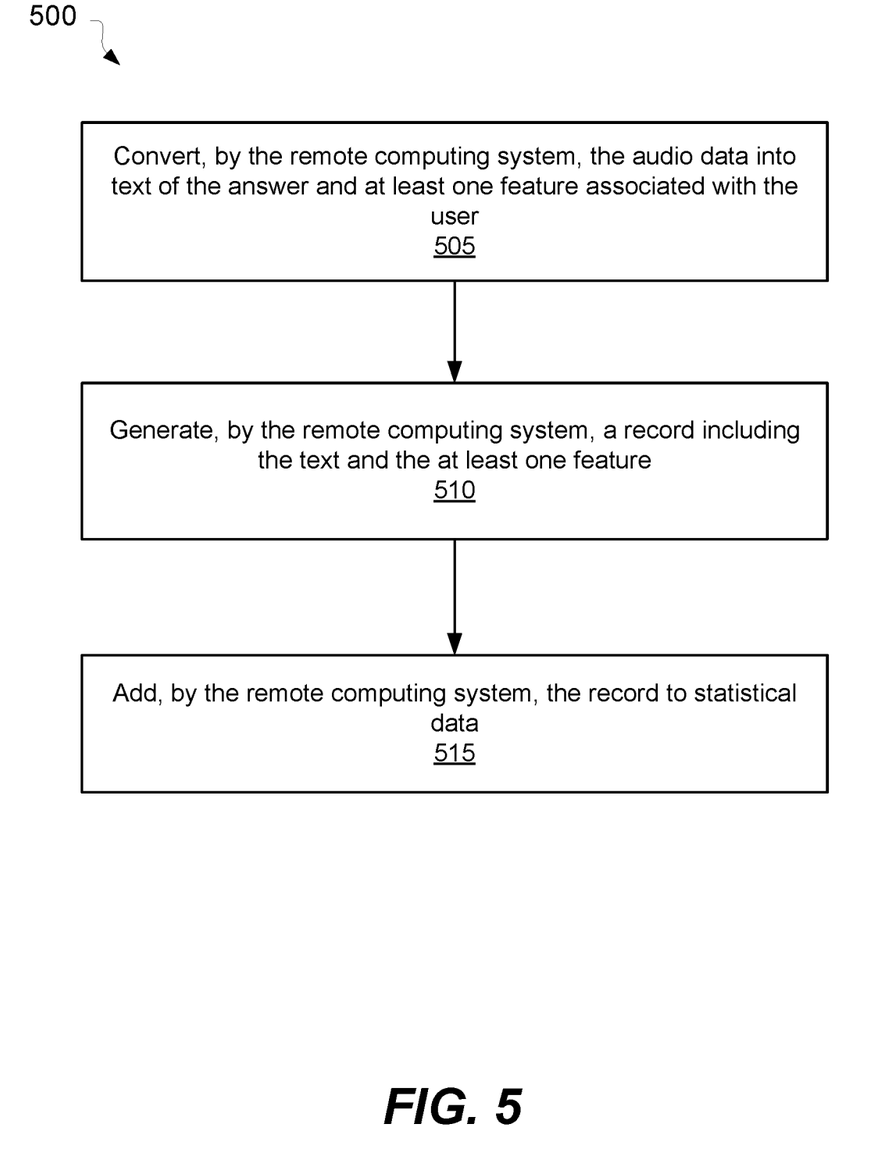

FIG. 5 is a flow chart showing a method 500 for voice-based collection of statistical data, according to an example embodiment. The method 500 can be implemented by using the remote computing system shown as the remote computing resource(s) 130 shown in FIG. 3. For example, the method 500 can be implemented as instructions stored in a memory of the remote computing system which, when being executed by processors of the remote computing system, may cause the remote computing system to perform the operations of the method 500. In some embodiments, the operations of method 500 may be combined, performed in parallel, or performed in a different order. The method 500 may also include additional or fewer operations than those illustrated.

The remote computing system may analyze the audio data to determine text of the answer and at least one feature associated with the user and convert the audio data into the text of the answer and the at least one feature associated with the user, as shown in block 505. In an example embodiment, the text of the answer may include the opinion of the user the concerning a product or a service associated with a provider. In other embodiments, the text of the answer may include characterization given by the user to the feature of the item the user possesses.

In an example embodiment, the at least one feature may be determined based on a background noise, characteristics of the user voice, such as a tone of the user voice, a volume of the user voice, a speed of the user voice, and other information present in the audio data. The at least one feature of the user may include one or more of the following: a gender of the user, an age of the user, an emotional state of the user (e.g., whether the user is excited, angry, upset, and the like), a medical condition of the user, a voice fingerprint of the user, and so forth. The at least one feature may further include one or more of the following: a location of the user, a musical background, a presence of children, a presence of a pet, and so forth.

In an example embodiment, the at least one feature may be determined based on a collection of background noise in the audio data received from the user device at different times. For example, the background noise may be collected over a period of time, such as a day, a week, a month, and the like. In this embodiment, the at least one feature may include a level or a type of activity of the user, a level of mobility of the user, estimation whether the user tends to stay at home or travels a lot, user habits (e.g., playing basketball once a week), user activity patterns (e.g., the user takes subway every morning and evening), and so forth.

The method 500 may further include generating, by the remote computing system, a record including the text and the at least one feature, as shown in block 510. The method 500 may continue with adding, by the remote computing system, the record to the statistical data in block 515.

Figure 6:
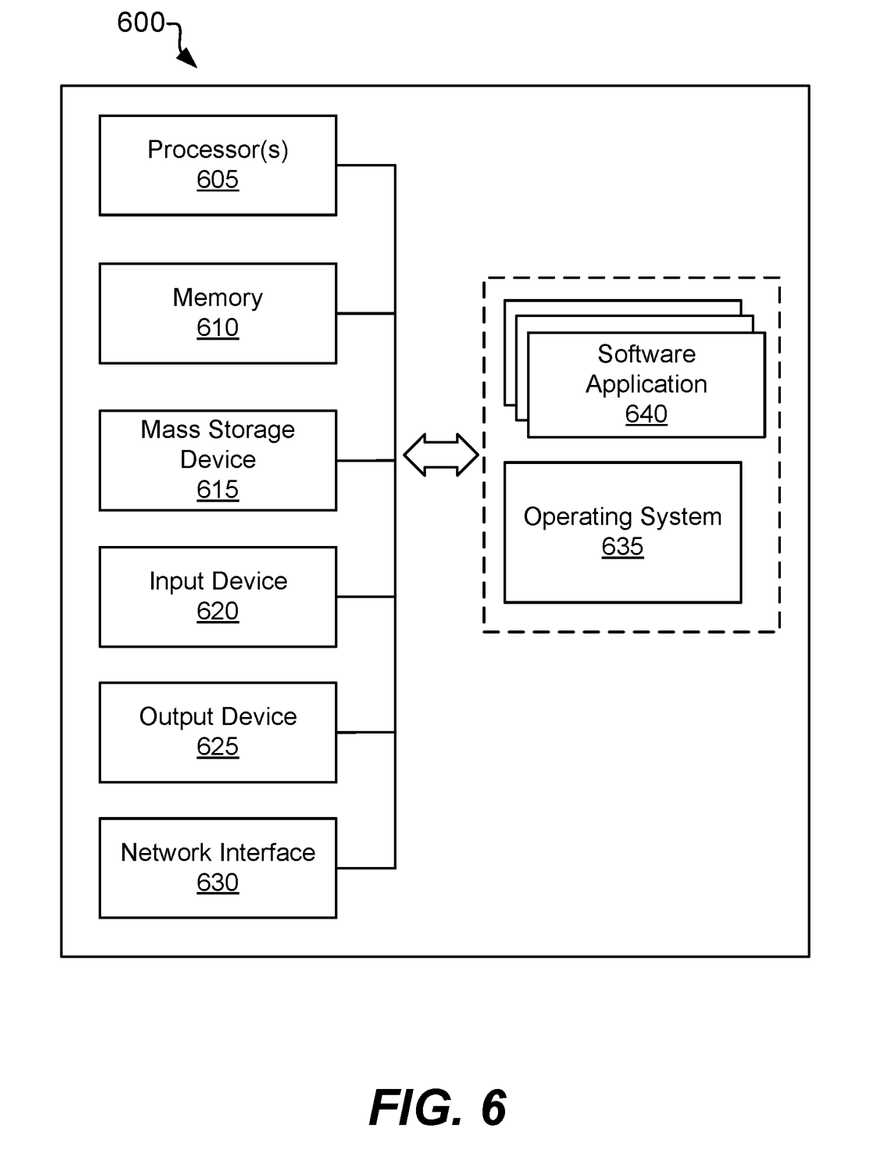
FIG. 6 is a high-level block diagram illustrating an example computer system, within which a set of instructions for causing the machine to perform any one or more of the methodologies discussed herein can be executed.

FIG. 6 is a high-level block diagram illustrating an example computer system 600, within which a set of instructions for causing the machine to perform any one or more of the methodologies discussed herein can be executed. The computer system 600 may include, refer to, or be an integral part of, one or more of a variety of types of devices, such as a general-purpose computer, a desktop computer, a laptop computer, a tablet computer, a netbook, a mobile phone, a smartphone, a personal digital computer, a smart television device, and a server, among others. In some embodiments, the computer system 600 is an example of a user device 110 or a remote computer resource(s) 130 shown in FIG. 1 or a system 300 for voiced-based collection of statistical data shown in FIG. 3. Notably, FIG. 6 illustrates just one example of the computer system 600 and, in some embodiments, the computer system 600 may have fewer elements/modules than shown on FIG. 6 or more elements/modules than shown on FIG. 6.

The computer system 600 may include one or more processors 605, a memory 610, one or more mass storage devices 615, one or more input devices 620, one or more output devices 625, and a network interface 630. The one or more processors 605 are, in some examples, configured to implement functionality and/or process instructions for execution within the computer system 600. For example, the processors 605 may process instructions stored in the memory 610 and/or instructions stored on the mass storage devices 615. Such instructions may include components of an operating system 635 or software applications 640. The computer system 600 may also include one or more additional components not shown in FIG. 6, such as a housing, a power supply, a battery, a GPS receiver, and so forth.

The memory 610, according to one example, is configured to store information within the computer system 600 during operation. The memory 610, in some example embodiments, may refer to a non-transitory computer-readable storage medium or a computer-readable storage device. In some examples, the memory 610 is a temporary memory, meaning that a primary purpose of the memory 610 may not be long-term storage. The memory 610 may also refer to a volatile memory, meaning that the memory 610 does not maintain stored contents when the memory 610 is not receiving power. Examples of volatile memories include random access memories (RAM), dynamic random-access memories (DRAM), static random-access memories (SRAM), and other forms of volatile memories known in the art. In some examples, the memory 610 is used to store program instructions for execution by the processors 605. The memory 610, in one example, is used by software (e.g., the operating system 635 or the software applications 640). Generally, the software applications 640 refer to software applications suitable for implementing at least some operations of the methods for voiced-based collection of statistical data as described herein.

The one or more mass storage devices 615 can also include one or more transitory or non-transitory computer-readable storage media and/or computer-readable storage devices. In some embodiments, the mass storage devices 615 may be configured to store greater amounts of information than memory 610. The mass storage devices 615 may further be configured for long-term storage of information. In some examples, the mass storage devices 615 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Still referencing to FIG. 6, the computer system 600 may also include one or more input devices 620. The input devices 620 may be configured to receive input from a user through tactile, audio, video, or biometric channels. Examples of the input devices 620 may include a keyboard, a keypad, a mouse, a trackball, a touchscreen, a touchpad, a microphone, one or more video cameras, image sensors, fingerprint sensors, or any other device capable of detecting an input from a user or other source and relaying the input to the computer system 600, or components thereof.

The output devices 625, in some examples, may be configured to provide output to the user through visual or auditory channels. The output devices 625 may include a video graphics adapter card, a liquid crystal display monitor, a light emitting diode (LED) monitor, an organic LED monitor, a sound card, a speaker, a lighting device, a LED, a projector, or any other device capable of generating output that may be intelligible to the user. The output devices 625 may also include a touchscreen, a presence-sensitive display, or other input/output capable displays known in the art.

The computer system 600, in some example embodiments, also includes a network interface 630. The network interface 630 can be utilized to communicate with external devices via one or more data networks such as one or more wired, wireless, or optical networks including, for example, the Internet, intranet, LAN, WAN, cellular phone networks, Bluetooth™ radio, and an IEEE 902.11-based radio frequency network, among others. The network interface 630 may be a network interface card, such as an Ethernet card, an optical transceiver, a radio frequency transceiver, or any other type of device that can send and receive information.

The operating system 635 may control one or more functionalities of computer system 600 and/or components thereof. For example, the operating system 635 may interact with the software applications 640 and may facilitate one or more interactions between the software applications 640 and components of the computer system 600. As shown in FIG. 6, the operating system 635 may interact with or be otherwise coupled to the software applications 640 and components thereof. In some embodiments, the software applications 540 may be included in the operating system 635. In these and other examples, virtual modules, firmware, or software may be part of the software applications 640.

Thus, systems and methods for voiced-based collection of statistical data have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for voiced-based collection of statistical data, the system comprising:
   a user device;
   an acoustic sensor associated with the user device and configured to sense an ambient acoustic signal; and
   one or more processors communicatively coupled to the user device and the acoustic sensor, the one or more processors being configured to:
      analyze a media stream, the media stream being played by the user device;
      determine, based on the analysis, that the user device has played a question prompting a user to answer the question;
      in response to the analysis and the determination:
         trigger recording of the ambient acoustic signal by the acoustic sensor;
         analyze the ambient acoustic signal to determine that the user has uttered an answer;
         convert the ambient acoustic signal including the uttered answer into audio data; and
         send, via the user device, the audio data to a remote computing system, wherein
      the remote computing system is configured to:
         convert the audio data into a text and at least one feature associated with the user;
         generate a record including the text and the at least one feature; and
         add the record to the statistical data.

2. The system of claim 1, wherein the at least one feature associated with the user includes one or more of the following: a gender of the user, an age of the user, an emotional state of the user, and a voice fingerprint of the user.

3. The system of claim 1, wherein the question includes a prompt for the user to express an opinion concerning a product or a service associated with a provider.

4. The system of claim 1, wherein the question includes a prompt for the user to characterize a feature of an item the user possesses.

5. The system of claim 4, wherein the item includes one of the following: a piece of furniture, a piece of appliances, and a vehicle.

6. The system of claim 4, wherein the feature of the item includes an age of the item.

7. The system of claim 1, wherein the at least one feature is determined based on a background noise in the audio data.

8. The system of claim 7, wherein the at least one feature includes one of the following: a location of the user, a musical background, a presence of children, and a presence of a pet.

9. The system of claim 1, wherein the at least one feature is determined based on a collection of background noise in audio data received from the user device at different times.

10. A method for voiced-based collection of statistical data, the method comprising:
    analyzing, by one or more processors communicatively coupled to a user device, a media stream, the media stream being played by the user device;
    determining, by the one or more processors, based on the analysis, that the user device has played a question prompting a user to answer the question;
    in response to the analysis and the determination, triggering, by the one or more processors, recording of an ambient acoustic signal by an acoustic sensor associated with the user device;
    analyzing, by the one or more processors, the ambient acoustic signal to determine that the user has uttered an answer;
    converting, by the one or more processors, the ambient acoustic signal including the uttered answer into audio data;
    sending, by the one or more processors and via the user device, the audio data to a remote computing system;
    converting, by the remote computing system, the audio data into a text and at least one feature associated with the user;
    generating, by the remote computing system, a record including the text and the at least one feature; and
    adding, by the remote computing system, the record to the statistical data.

11. The method of claim 10, wherein the at least one feature associated with the user includes one or more of the following: a gender of the user, an age of the user, an emotional state of the user, and a voice fingerprint of the user.

12. The method of claim 10, wherein the question includes a prompt for the user to express an opinion concerning a product or a service associated with a provider.

13. The method of claim 10, wherein the question includes a prompt for the user to characterize a feature of an item the user possesses.

14. The method of claim 13, wherein the item includes one of the following: a piece of furniture, a piece of appliances, and a vehicle.

15. The method of claim 13, wherein the feature of the item includes an age of the item.

16. The method of claim 10, wherein the at least one feature is determined based on a background noise in the audio data.

17. The method of claim 16, wherein the at least one feature includes one of the following: a location of the user, a musical background, a presence of children, and a presence of a pet.

18. The method of claim 10, wherein:
the at least one feature is determined based on a collection of background noise in audio data received from the user device at different times.

19. A non-transitory processor-readable medium having instructions stored thereon, which when executed by one or more processors, cause the one or more processors to implement a method for voiced-based collection of statistical data, the method comprising:
- analyzing, by one or more processors communicatively coupled to a user device, a media stream, the media stream being played by the user device;
- determining, by the one or more processors, based on the analysis, that the user device has played a question prompting a user to answer the question;
- in response to the analysis and the determination, triggering, by the one or more processors, recording of an ambient acoustic signal by an acoustic sensor associated with the user device;
- analyzing, by the one or more processors, the ambient acoustic signal to determine that the user has uttered an answer;
- converting, by the one or more processors, the ambient acoustic signal including the uttered answer into audio data;
- sending, by the one or more processors and via the user device, the audio data to a remote computing system, wherein the remote computing system is configured to:
- convert the audio data into a text and at least one feature associated with the user;
- generate a record including the text and the at least one feature; and
- add the record to the statistical data.

* * * * *